United States Patent Office 3,055,762
Patented Sept. 25, 1962

3,055,762
VITREOUS ENAMEL
Lewis C. Hoffman, Scotch Plains, N.J., assignor to E. I. du Pont de Nemours and Company, Wilmington, Del., a corporation of Delaware
No Drawing. Filed Dec. 7, 1960, Ser. No. 74,212
3 Claims. (Cl. 106—49)

This invention relates to an improved vitreous enamel, and more particularly it relates to a vitreous enamel having a marked superiority for use in the application of vitreous enamel labels on glass bottles or other glass surfaces.

Vitreous enamel labels and colored indicia or other glass coatings have for some time been applied to beverage bottles and other glass surfaces. Such glass coatings are necessarily required to be composed of vitreous enamel compositions that will fuse and coalesce at a temperature below that at which the underlying glass surface may become soft and deform. They must therefore be capable of firing at a temperature of 640° C. or below. Moreover, they must have a slightly lower coefficient of thermal expansion than the bottle or other glass surface on which they are to be adhered to prevent the development of highly objectionable stresses upon cooling the glass from the firing temperature. A linear coefficient of thermal expansion of the glass overlayer of from about 2 to $7 \times 10^{-7}$ cm./cm./° C. below that of the underlying glass surface is considered to be satisfactory.

Beverage bottles are, for the most part, used for several trips. That is, after one use they are washed, refilled and resealed. They undergo an average of about 30 trips in this manner and some bottles are subjected to as many as 100 trips. Each time a bottle is washed it is exposed to an alkaline detergent solution at an elevated temperature. Such solutions, usually containing phosphate ions, are quite corrosive of the enamel labels. The vitreous enamel to be used for such labels must therefore be highly resistant to alkaline detergents.

Again such bottles are often subjected to fruit acids and other acids as well as $SO_2$ and $H_2S$ present in cardboard packing containers. The vitreous label enamels must therefore also have greater than usual acid resistance.

It is an object of this invention to produce an improved vitreous enamel frit suitable for use as a label on glass beverage bottles.

It is a further object to provide a vitreous enamel frit suitable for use as a label on glass beverage bottles and having improved melting point, expansion coefficient, and alkali and acid resistance characteristics.

Other objects of the invention will appear hereinafter.

These objects may be accomplished by providing a vitreous enamel frit composition comprising,

|  | Mol percent |
|---|---|
| $SiO_2$ | 37 to 50 |
| $B_2O_3$ | 5 to 10 |
| $PbO$ | 22 to 30 |
| $PbF_2$ | 3 to 8 |
| $NaF$ | 7 to 14 |
| $ZrO_2$ | 1 to 6 |
| $TiO_2$ | 0 to 8 |
| $ZnO$ | 0 to 7 |
| $CdO$ | 0 to 4 |

This vitreous enamel frit may without material disadvantage contain a total of up to 10 mol percent of other oxides sometimes contained in enamel frits, provided, however, that not more than 4 mol percent thereof be composed of a single such other frit ingredient.

It has been found in accordance with this invention that small amounts of $PbF_2$ in combination with small amounts of $NaF$ will lower the maturing temperature of the enamel frits without materially increasing the coefficient of thermal expansion of the frit. Moreover, the added $PbF_2$ was found capable of dissolving greater amounts of the refractory components in an enamel in a given time. That is to say, $TiO_2$, $ZrO_2$ and $SiO_2$ contents of a frit are dissolved more rapidly by the presence of $PbF_2$ than in the presence of other fluorides. This is of decided advantage because the glass melting process is a competition between rapid solution, volatility of ingredients and refractory dissolution.

The combination of $PbF_2$ with $NaF$ produces superior results to the use of $PbF_2$ alone or to the use of $NaCO_3$ or $NH_4F$ in combination with $PbF_2$. The combination of $PbF_2$ and $NaF$ produces a frit having a 10° C. lower melting point than the other said combinations in similar amounts without sacrifice of chemical resistance or expansion coefficient.

The other listed ingredients are also considered to be important to obtaining the above-described balanced characteristics. In the enamel frit compositions of this invention the $SiO_2$ contributes to low thermal expansion but must be regulated to prevent high maturing temperature. The $B_2O_3$ lowers maturing temperature at a sacrifice of chemical resistance with a gradual increase in thermal expansion. $PbO$ lowers maturing temperature at a sacrifice of chemical resistance with a gradual increase in thermal expansion. $NaF$ lowers maturing temperature with an increase in thermal expansion. $ZrO_2$ increases alkali resistance and maturing temperature. $TiO_2$ increases acid resistance and maturing temperature but has a tendency to crystallize from the enamel on firing to produce an unpleasant yellow shade. $ZnO$ tends to minimize this tendency without detrimental effect on the other properties. The $CdO$ serves to prevent the reaction of $PbO$ with sulfide pigments such as $CdS$ yellow or $Cd(S\ Se)$ reds, where used in colored labels, to form black $PbS$. It is critical in accordance with this invention that the $PbF_2$ content and the $NaF$ content be present in the enamel composition in the mol percentages above set forth.

The following three tables disclose sixteen specific examples of compositions coming within the scope of the present invention. Table I discloses the compositions in mol percent, and Table II discloses the same examples expressed in weight percent for purposes of comparison with the prior art compositions expressed in weight percent. Table III again discloses the same 16 compositions in weight percent of the batch ingredients from which the compositions are prepared.

TABLE I
Melted Compositions, Mol Percent

|  | 1 | 2 | 3 | 4 | 5 | 6 | 7 | 8 | 9 | 10 | 11 | 12 | 13 | 14 | 15 | 16 | Ranges |
|---|---|---|---|---|---|---|---|---|---|---|---|---|---|---|---|---|---|
| $SiO_2$ | 40.0 | 42.7 | 40.8 | 45.6 | 44.0 | 48.2 | 37.5 | 45.5 | 43.0 | 42.5 | 46.5 | 41.7 | 72.6 | 45.6 | 45.0 | 49.9 | (37–50) |
| $B_2O_3$ | 7.8 | 7.6 | 9.1 | 6.1 | 5.9 | 5.7 | 9.4 | 6.2 | 5.9 | 6.2 | 5.9 | 6.4 | 6.2 | 5.8 | 5.8 | 7.6 | (5–10) |
| $PbO$ | 26.6 | 24.6 | 25.7 | 26.8 | 24.4 | 22.4 | 25.1 | 23.3 | 25.2 | 26.1 | 25.6 | 29.6 | 27.6 | 23.2 | 23.2 | 25.6 | (22–30) |
| $PbF_2$ | 4.0 | 3.9 | 3.9 | 4.0 | 3.9 | 3.7 | 4.0 | 7.1 | 3.9 | 4.0 | 3.9 | 4.1 | 4.0 | 3.8 | 3.8 | 3.9 | (3–8) |
| $NaF$ | 10.7 | 10.5 | 11.8 | 10.7 | 10.5 | 10.1 | 10.7 | 10.8 | 13.1 | 10.8 | 10.5 | 11.2 | 10.8 | 10.3 | 10.3 | 7.8 | (7–14) |
| $ZrO_2$ | 4.6 | 4.5 | 4.5 | 4.6 | 4.5 | 5.2 | 5.5 | 4.2 | 4.1 | 4.7 | 4.5 | 4.8 | 3.8 | 5.3 | 4.4 | 1.8 | (1–6) |
| $TiO_2$ | 4.3 | 4.2 | 4.2 | 2.2 |  | 4.7 | 4.3 | 2.9 | 4.8 | 2.2 | 2.1 | 2.2 | 5.0 | 6.0 | 7.5 | 3.4 | (0–8) |
| $ZnO$ | 2.0 | 2.0 |  |  | 6.8 |  |  |  |  |  |  |  |  |  |  |  | (0–7) |
| $CdO$ |  |  |  |  |  |  | 3.5 |  |  | 3.5 |  |  |  |  |  |  | (0–4) |

TABLE II
*Melted Compositions, Weight Percent*

|  | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $SiO_2$ | 21.2 | 23.2 | 22.2 | 24.2 | 24.2 | 27.2 | 20.2 | 24.2 | 23.2 | 22.2 | 25.2 | 21.2 | 22.2 | 25.2 | 25.2 | 27.2 |
| $B_2O_3$ | 4.8 | 4.8 | 5.8 | 3.8 | 3.8 | 3.8 | 5.8 | 3.8 | 3.8 | 3.8 | 3.8 | 3.8 | 3.8 | 3.8 | 3.8 | 4.8 |
| $PbO$ | 52.0 | 50.0 | 51.5 | 53.0 | 49.5 | 47.0 | 49.5 | 45.5 | 51.0 | 51.0 | 52.0 | 56.0 | 54.0 | 48.0 | 48.0 | 52.0 |
| $PbF_2$ | 8.5 | 8.5 | 8.5 | 8.5 | 8.5 | 8.5 | 8.5 | 15.0 | 8.5 | 8.5 | 8.5 | 8.5 | 8.5 | 8.5 | 8.5 | 8.5 |
| $NaF$ | 4.0 | 4.0 | 4.5 | 4.0 | 4.0 | 4.0 | 4.0 | 4.0 | 5.0 | 4.0 | 4.0 | 4.0 | 4.0 | 4.0 | 4.0 | 3.0 |
| $ZrO_2$ | 5.0 | 5.0 | 5.0 | 5.0 | 5.0 | 6.0 | 4.5 | 4.5 | 5.0 | 5.0 | 5.0 | 5.0 | 4.0 | 6.0 | 5.0 | 2.0 |
| $TiO_2$ | 3.0 | 3.0 | 3.0 | 1.5 |  | 3.5 | 3.0 | 2.0 | 3.5 | 1.5 | 1.5 | 1.5 | 3.5 | 4.5 | 5.5 | 2.5 |
| $ZnO$ | 1.5 | 1.5 |  |  | 5.0 |  |  |  |  |  |  |  |  |  |  |  |
| $CdO$ |  |  |  |  |  |  | 4.0 |  |  | 4.0 |  |  |  |  |  |  |

TABLE III
*Batches, Weight Percent*

|  | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $SiO_2$ | 20.4 | 22.3 | 21.0 | 23.5 | 23.5 | 26.4 | 19.4 | 23.7 | 22.3 | 21.6 | 24.5 | 20.6 | 21.6 | 24.5 | 24.5 | 26.2 |
| $H_3BO_3$ | 8.3 | 8.3 | 9.9 | 6.6 | 6.6 | 6.6 | 9.9 | 6.7 | 6.7 | 6.6 | 6.6 | 6.6 | 6.6 | 6.6 | 6.6 | 8.3 |
| $PbO$ | 50.1 | 48.2 | 49.0 | 51.3 | 47.7 | 45.4 | 47.3 | 44.6 | 50.0 | 49.3 | 50.3 | 54.2 | 52.3 | 46.5 | 46.5 | 50.1 |
| $PbF_2$ | 8.2 | 8.2 | 8.0 | 8.3 | 8.5 | 8.5 | 8.5 | 8.1 | 14.7 | 8.3 | 8.3 | 8.3 | 8.3 | 8.3 | 8.3 | 8.2 |
| $NaF$ | 3.9 | 3.9 | 4.3 | 3.9 | 3.9 | 3.9 | 3.9 | 3.8 | 4.9 | 3.9 | 3.9 | 3.9 | 3.9 | 3.9 | 3.9 | 2.9 |
| $ZrO_2$ | 4.8 | 4.8 | 4.8 | 4.9 | 4.9 |  | 5.8 | 4.8 | 4.4 | 4.4 | 4.9 | 4.9 | 4.9 | 5.8 | 4.9 | 1.9 |
| $TiO_2$ | 2.9 | 2.9 | 2.9 | 1.5 |  | 3.4 | 2.9 | 2.0 | 3.4 | 1.5 | 1.5 | 1.5 | 3.4 | 4.4 | 5.3 | 2.4 |
| $ZnO$ | 1.4 | 1.4 |  |  | 4.9 |  |  |  |  |  |  |  |  |  |  |  |
| $CdO$ |  |  |  |  |  |  | 3.8 |  |  | 3.9 |  |  |  |  |  |  |

As above stated, the enamels of this invention must have a maturing temperature of not to exceed 640° C. (1184° F.). The compositions listed in the tables have maturing temperatures between about 570 and 620° C., thermal expansions between about 85 and 90×10⁻⁷ cm./cm./° C. and outstanding chemical resistance. All of these enamels will resist the attack of an aqueous alkaline solution containing 9% NaOH and 1% $Na_3PO_4$ at 80–90° C. for a period exceeding 24 hours. This method of testing the chemical resistance of enamels is commonly used as an accelerated test for applied vitreous enamel labels for beverage bottles. Enamels heretofore used in the arts for such enamel labels failed to withstand the above test for a period of over 22 hours. The compositions of this invention have outstanding resistance to acids. They will show no visible attack on exposure for 15 minutes to 10% citric acid at room temperature. This acid resistivity test is also a common accelerated test for the acid durability of beverage bottle labels and for the weatherability of enamels for achitectural glass.

The enamels of this invention may be used in enamelling or glazing glass substrates having thermal expansions of about 85 to 95×10⁻⁷ cm./cm./° C. This includes most of the "soda-lime-silicate" glasses commonly used for bottles, window and plate glass.

The enamel compositions of this invention may be ground to a fine state of subdivision, intimately mixed with ceramic pigment particles, applied with the help of a binder onto the surface of a glass to be enameled and fired to fuse the glass enamel composition to the glass substrate, all in a manner well-known in the art.

In preparing these frit compositions complete dissolution of the batch components must be attained and usually special care is taken to see that the $ZrO_2$ is dissolved. To ascertain the completeness of melting, samples of the melt may be taken and examined in a known manner for detection of undissolved material. The crucibles used for batch dissolution of the compositions may be composed of fireclay-grog, kyanite, platinum or any other commonly used crucible material.

The time required for dissolution of the batch ingredients (usually determined by the time necessary to dissolve the $Z_rO_2$) is a function of the temperature of the melting operation. A 100 gram batch of the composition shown in Example 1 of the tables when placed in a platinum crucible and melted in an electrical resistor furnace will melt in 85 minutes at 1200° C., in 40 minutes at 1250° C., in 36 minutes at 1300° C. and 22 minutes at 1350° C. Such times and temperatures can only constitute a general guide since the time required at a given temperature is also a function of the size of the batch and the particular heat transfer conditions of the furnace. Crucible temperatures may vary from 1000° C. to 1500° C., as desired.

Upon complete dissolution of the batch ingredients the molten batch is fritted in a known manner by pouring the same into water which shatters it into small pieces forming thereby the enamel frit. Low temperature fritting with air or other means as employed in the art may alternatively be used if desired.

The frit may, if desired, be dried before grinding to form the enamel. The grinding is usually carried out in a ball mill at which point pigments or coloring materials or other additives are usually added. For example, 10% of $TiO_2$ opaquing pigment may be added to the frit composition of Example 1. The grinding is usually carried out with sufficient water or other liquid to produce a pourable or sprayable product. The resulting frit slurry may be sprayed directly onto the glass bottle or other glass substrate. The sprayed-on coating is then dried and fired.

If desired the enamels may be milled dry or dried after wet milling and later mixed with a desired binder vehicle whereby to apply the enamel to a surface by spraying, dipping, brushing or stenciling. As an example of a suitable vehicle for the enamel application, one compound of methyl cellulose 0.75%, sodium chloride 1%, octyl alcohol 0.05% and water 98.2% (all parts by weight) may be used. Another useful vehicle consists of commercial water glass (sodium silicate solution) 0.4%, sodium fluosilicate 0.4% and water 99.2%. A suitable vehicle for applying the vitreous enamel by the squeegee-stencil application procedure is one composed of ethyl cellulose (25 C.P.S. viscosity grade) 4% soya lecithin 0.25%, and terpineol 95.75%.

It is desirable to apply the enamel to the surface of the glass substrate in any manner that will provide a uniform and smooth coating before firing. The thickness of the coat may be varied within wide limits according to the type of effect desired, e.g. 15 to 30 grams (based on the dry weight of enamel) per square foot.

After application of the enamel to the substrate, the composition is fired in a suitable furnace in order to fuse the powdered enamel to a continuous glossy coating. The firing conditions are not critical, except that the article must be brought to a temperature high enough to melt the enamel but not high enough to materially deform the glass substrate. The temperature necessary depends to some extent upon the particular composition of the glass substrate as well as the enamel. Usually a temperature of between 900° F. and 1200° F. will be suitable. It is merely necessary to keep the coated article at the selected temperature for a few minutes to permit the enamel to fuse completely to a uniform, adherent, vitreous layer.

The enamel compositions of this invention, as compared to vitreous label enamels heretofore known, have a higher chemical resistance to alkalis and acids and have a lower maturing temperature as a result of which they can be applied and fired with good adherence and without endangering the simultaneous melting of glass substrates.

Parts, proportions and percentages as used throughout the specification and claims refer to parts, proportions and percentages by weight except where mol percentages have been specifically referred to.

Since it is obvious that many changes and modifications can be made in the above-described details without departing from the nature and spirit of the invention, it is to be understood that the invention is not to be limited to said details except as set forth in the appended claims.

I claim:

1. A vitreous enamel frit suitable for use as vitreous enamel labels on glass substrates having a maturing temperature below 1184° F. and a thermal expansion of between 85 and $90 \times 10^{-7}$ cm./cm./° C., at least 90 mol percent of the frit consisting of

| | Mol percent |
|---|---|
| $SiO_2$ | 37 to 50 |
| $B_2O_3$ | 5 to 10 |
| PbO | 22 to 30 |
| $PbF_2$ | 3 to 8 |
| NaF | 7 to 14 |
| $ZrO_2$ | 1 to 6 |
| $TiO_2$ | 0 to 8 |
| ZnO | 0 to 7 |
| CdO | 0 to 14 | and up to 10 mol percent of said frit consisting of other known frit ingredients with not to exceed 4 mol percent of any one known ingredient, all of said oxides being melted into said enamel compositions.

2. A process for applying a vitreous enamel layer on a glass substrate which comprises fusing thereon a vitreous enamel having a maturing temperature below 1184° F. and a thermal expansion of between 85 and $90 \times 10^{-7}$ cm./cm./° C., at least 90 mol percent of the frit consisting of

| | Mol percent |
|---|---|
| $SiO_2$ | 37 to 50 |
| $B_2O_3$ | 5 to 10 |
| PbO | 22 to 30 |
| $PbF_2$ | 3 to 8 |
| NaF | 7 to 14 |
| $ZrO_2$ | 1 to 6 |
| $TiO_2$ | 0 to 8 |
| ZnO | 0 to 7 |
| CdO | 0 to 14 | and up to 10 mol percent of said frit consisting of other known frit ingredients with not to exceed 4 mol percent of any one known ingredient, all of said oxides being melted into said enamel composition.

3. A glass substrate containing fused to the surface thereof a vitreous enamel having a maturing temperature below 1184° F. and a thermal expansion of between 85 and $90 \times 10^{-7}$ cm./cm./° C., at least 90 mol percent of the frit consisting of

| | Mol percent |
|---|---|
| $SiO_2$ | 37 to 50 |
| $B_2O_3$ | 5 to 10 |
| PbO | 22 to 30 |
| $PbF_2$ | 3 to 8 |
| NaF | 7 to 14 |
| $ZrO_2$ | 1 to 6 |
| $TiO_2$ | 0 to 8 |
| ZnO | 0 to 7 |
| CdO | 0 to 14 | and up to 10 mol percent of said frit consisting of other known frit ingredients with not to exceed 4 mol percent of any one known ingredient, all of the said oxides being melted into said enamel composition.

References Cited in the file of this patent

UNITED STATES PATENTS

| 2,255,044 | Deyrup | Sept. 9, 1941 |
| 2,278,868 | Deyrup | Apr. 7, 1942 |
| 2,356,317 | Harbert et al. | Aug. 22, 1944 |
| 2,413,549 | Deyrup | Dec. 31, 1946 |

UNITED STATES PATENT OFFICE
CERTIFICATE OF CORRECTION

Patent No. 3,055,762            September 25, 1962

Lewis C. Hoffman

It is hereby certified that error appears in the above numbered patent requiring correction and that the said Letters Patent should read as corrected below.

Columns 1 and 2, TABLE I, opposite "$SiO_2$", column 13, line 1 thereof, for "72.6" read -- 42.6 --.

Signed and sealed this 6th day of August 1963.

(SEAL)
Attest:

ERNEST W. SWIDER
Attesting Officer

DAVID L. LADD
Commissioner of Patents